United States Patent Office 3,642,899
Patented Feb. 15, 1972

3,642,899
2-PHENYL-4-(1-ADAMANTYL)-6-DIMETHYL-AMINOMETHYLPHENOL
David W. Henry, Menlo Park, Calif., assignor to the United States of America as represented by the Secretary of the Army
No Drawing. Filed Nov. 26, 1969, Ser. No. 880,431
Int. Cl. C07c 87/28
U.S. Cl. 260—570.9     1 Claim

ABSTRACT OF THE DISCLOSURE

The disclosure describes three compounds, 2-phenyl-4-(1-adamantyl)-6-dimethylaminomethylphenol, 2-phenyl-4 - t - butyl - 6 - [N - methyl - N - (2 - cyanoethyl)]aminomethylphenol and 2-phenyl-4-t-butyl-6-[N-methyl-N-(n-octyl)aminomethyl]phenol hydrochloride. The compounds are useful in the prevention and treatment of malaria.

---

The invention herein described was made in the course of or under a contract or subcontract thereunder with the Department of the Army.

BACKGROUND OF THE INVENTION

(1) Field of the invention

This invention relates to three derivatives of 2-phenylphenol useful in the prevention and treatment of malaria. More specifically, it relates to three new antimalarial compounds, 2-phenyl-4-(1-adamantyl)-6-dimethylaminomethylphenol, 2 - phenyl - 4 - t-butyl-6-[N-methyl-N-(2-cyanoethyl)]aminomethylphenol and 2-phenyl-4-t-butyl-6-[N-methyl-N-(n-octyl)aminomethyl]phenol hydrochloride.

(2) Description of the prior art

Malaria is one of the most widespread of all human diseases; it has been estimated that over 200 million people are afflicted and over a million die each year from malaria. Furthermore, contrary to popular belief, malaria is not confined to the tropical and subtropical regions; outbreaks have occurred almost as far north as the Arctic Circle and to a corresponding latitude south. It is a protozoan disease caused by several species of the genus Plasmodium which forms one of the families of the sub-order Haemsporida. Plasmodium vivax and Plasmodium falciparum are the most common species causing malaria in humans.

A number of antimalarial compounds have been prepared in the prior art, see for example the antimalarials section in Remington's Pharmaceutical Sciences, 13th edition (1965), pages 1302–1306. Recently, however, the prior art antimalarials have proved to be ineffective in specific cases in various parts of the world. The World Health Organization Technical Report #296 (1965), entitled "Resistance of Malaria Parasites to Drugs," reports the following cases of drug resistance: quinine sulfate failed completely against strains of Plasmodium falciparum from New Guinea; chloroquine, amodiaquine, mepacrine, pyrimethamine and proguanil gave poor results against Plasmodium falciparum from Thailand; chloroquine, mepacrine, pyrimethamine and proguanil were ineffective against Plasmodium falciparum from Cambodia; Plasmodium falciparum from Vietnam proved resistant to chloroquine; and chloroquine gave poor results against malaria in Malaya. Further instances of drug resistant malaria may be seen in L. Bruce-Chwatt, Trans. Roy. Soc. Trop. Med. Hyg. 59, 105–144 (1965), in L. Legters et al., Military Med. 130, 168–176 (1965), and in A. Bourke et al., Trans. Roy. Sec. Trop. Med. Hyg. 60, 225–230 (1966).

The only conclusion to be drawn from these reports is that there exists a great need for new antimalarial drugs.

With respect to the new antimalarial compounds that comprise this invention, the prior art includes some work on Mannich bases. Burckhalter et al. synthesized some simply substituted alpha- aminocreosols that revealed only slight activity as antimalarials, see J. Am. Chem. Soc. 68, 1894 (1946), and the same group of researchers patented certain amino methyl phenols in U.S. Pat. No. 2,459,338, issued Jan. 18, 1949.

SUMMARY OF THE INVENTION

This invention comprises the preparation of three new derivatives of 2-phenylphenol and the discovery that these new compositions of matter are effective antimalarials. The three new compounds, 2-phenyl-4-(1-adamantyl)-6-dimethylaminomethylphenol, 2 - phenyl - 4 - t-butyl-6-[N-methyl-N-(2-cyanoethyl)]aminomethylphenol, and 2-phenyl-4-t-butyl-6-[N-methyl-N - (n - octyl)aminomethyl] phenol hydrochloride, have shown remarkable activity for the prevention and treatment of malaria in laboratory evaluation tests.

Accordingly, it is an object of this invention to prepare new compositions of matter that are derivatives of 2-phenylphenol.

Another object of this invention is to prepare new compositions of matter that are derivatives of 2-phenylphenol and that are active antimalarials.

A further object of this invention is to provide new processes for the prevention and treatment of malaria in mammals, and particularly in humans, wherein the active antimalarial ingredients are new derivatives of 2-phenylphenol.

Finally, it is an object of this invention to prepare new compositions of matter that will be active against malaria resistant to presently available drugs.

DESCRIPTION OF THE PREFERRED EMBODIMENTS

The new compositions of matter are prepared as follows:

EXAMPLE 1

Preparation of 2-phenyl-4-(1-adamantyl)-6-dimethylaminomethylphenol

A mixture of 8.5 g. (0.050 mole) of 2-phenylphenol and 10.7 g. (0.050 mole) of 1-bromoadamantane was heated at 150° C. for 105 minutes. The cooled melt was dissolved in ca. 150 ml. of diethyl ether and dilute with ca. 100 ml. of 30–60° petroleum ether to the point of the incipient precipitation. This solution was filtered through 200 g. of acid-washed $Al_2O_3$, and the adsorbent wash washed with 1.5 l. of 1:1 diethyl ether-petroleum ether. The combined eluates were boiled to dryness and the solid residue was recrystallized from ca. 125 ml. of heptane to give 7.9 g. of the intermediate, 2-phenyl-4-(1-adamantyl) phenol, M.P. 155–165° C. This was recrystallized to give 6.4 g. (42% yield), M.P. 165–169° C. This intermediate material was satisfactory for further synthetic work. The elemental analysis of this intermediate compound was as follows:

*Analysis.*—Calculated for $C_{22}H_{24}O$ (percent): C, 86.8; H, 7.95. Found (percent): C, 86.7; H, 7.98.

The Mannich reaction was employed to produce the desired end product. A solution containing the intermediate, 2-phenyl-4-(1-adamantyl)phenol (4.5 g., 15 mmoles), 25% aqueous $(CH_3)_2NH$ (2.7 g., 15 mmoles), and 37% aqueous HCHO (1.2 g., 15 mmoles) in 100 ml. of ethyl alcohol was refluxed for three hours, diluted with water, and extracted with diethyl ether to give 4.7 g. of crude product.

Thin-layer chromatography showed some unreacted starting material to be present, so the reaction was rerun on the crude product with an excess of $(CH_3)_2NH$ and HCHO. Recrystallization of the product from heptane gave 3.17 g. (59% yield) of the desired product, 2-phenyl-4-(1 - adamantyl)-6-dimethylaminomethylphenol, melting at 140.5–143.0° C. The elemental analysis was as follows:

*Analysis.*—Calculated for $C_{25}H_{31}NO$ (percent): C, 83.1; H, 8.64; N, 3.87. Found (percent): C, 83.2; H, 8.66; N, 3.69.

EXAMPLE 2

Preparation of 2-phenyl-4-t-butyl-6-[N-methyl-N-(2-cyanoethyl)]aminomethylphenol A solution of 4.52 g. (20 mmoles) of 2-phenyl-4-t-butylphenol (obtained from Dow Chemical Company), 1.68 g. (20 mmoles) of 3-methylaminopropionitrile, and 1.65 g. (20 mmoles) of 37% aqueous HCHO in 45 ml. of ethyl alcohol was refluxed for three hours. The reaction mixture was diluted with water, and extracted with $CHCl_3$ to give 6.2 g. (96% yield) of crude product, 2-phenyl-4-t-butyl-6-[N-methyl - N - (2-cyanoethyl)]aminomethylphenol. Recrystallization from heptane gave analytically pure product, M.P. 150.5–153.0° C.

The elemental analysis was as follows:

*Analysis.*—Calculated for $C_{21}H_{26}N_2O$ (percent): C, 78.2; H, 8.13; N, 8.69. Found (percent): C, 78.5; H, 8.33; N, 8.48.

EXAMPLE 3

Preparation of 2-phenyl-4-t-butyl-6-[N-methyl-N-(n-octyl)aminomethyl]phenol hydrochloride A solution of 4.52 g. (20 mmoles) of 2-phenyl-4-t-butylphenol (obtained from Dow Chemical Company), 1.65 g. (20 mmoles) of 37% aqueous HCHO and 2.87 g. (20 mmoles) of N-methyl-N-(n-octyl)amine in 45 ml. of 95% ethyl alcohol was refluxed for three hours. A sample examined by thin-layer chromatography (silica gel-diethyl ether) showed about half of the starting materials remaining. An additional 3.3 g. (40 mmoles) of 37% aqueous HCHO and 5.74 g. (40 mmoles) of N-methyl-N-(n-octyl)amine was added and refluxing was continued for an additional three hours. The reaction mixture was diluted with water and extracted with diethyl ether. The diethyl ether was boiled off and the excess methyloctylamine was removed in vacuo using a sublimation apparatus with liquid nitrogen as the coolant for the cold finger. The residue from the sublimation was chromatographed over 170 g. of silica gel. Elution with diethyl ether gave 6.7 g. of oily product which was only slightly impure according to thin-layer chromatography (product $R_f$ 0.9). Treatment of 6.1 g. of this material in diethyl ether with an equivalent of ethanolic HCl, followed by further dilution with diethyl ether, failed to induce precipitation of the desired end product HCl salt. Addition of pentane and subsequent cooling in the freezer finally effected precipitation of the end product, 2-phenyl-4-t-butyl-6-[N-methyl-N-(n-octyl) aminomethyl]phenol hydrochloride. The yield was 3.9 g. (51.3%) and the product had a melting point of 78–82.5° C.

An elemental analysis gave these results:

*Analysis.*—Calculated for $C_{26}H_{39}NO \cdot HCl$ (percent): C, 74.7; H, 9.64; N, 3.35. Found (percent): C, 74.6; H, 9.91; N, 3.45.

The three new compounds, 2-phenyl-4-(1-adamantyl)-6-dimethylaminomethylphenol, 2 - phenyl-4-t-butyl-6-[N-methyl - N - (2 - cyanoethyl)]aminomethylphenol, and 2-phenyl-4-t-butyl - 6 - [N-methyl-N-(n-octyl)aminomethyl] phenol hydrochloride, show unexpected and unobvious antimalarial activity. This fact can be seen in the following table which gives the results of antimalarial evaluations using the Walter Reed Army Institute of Research primary mouse screen test on the new derivatives of 2-phenylphenol:

ANTIMALARIAL EVALUATION OF 2-PHENYLPHENOL DERIVATIVES

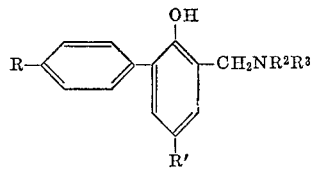

| | R | R' | NR²R³ | Salt | Antimalarial bioassay results [1] | | | | | |
|---|---|---|---|---|---|---|---|---|---|---|
| | | | | | 20 mg./kg.[2] | 40 | 80 | 160 | 320 | 640 |
| Example: | | | | | | | | | | |
| 1 | H | 1-adamantyl | NMe₂ | | 0.2 | 0.2 | 2.6 | 9.0 | 10.8 | 11.4 |
| 2 | H | t-Bu | NMeCH₂CH₂CN | | | | 3.7 | 4.1 | 6.3 | |
| | | | | | 0.2 | 0.2 | 1.6 | 3.4 | 4.4 | 6.4 |
| 3 | H | t-Bu | N(Me)n-Oct | HCl | | 0.3 | | 6.3 | | 9.6 |
| | | | | | 0.5 | 0.5 | 4.7 | 6.5 | 7.2 | 9.9 |

[1] Increase in survival time (in number of days) of treated mice beyond that of untreated controls after single subcutaneous dosages (three days post-infection) of 20, 40, 80, 160, 320 and 640 mg. of drug per kg. of body weight. Average survival time of untreated mice: 6.5 plus or minus 0.5 days. Infecting organism: *Plasmodium berghei*. Quinine gives values of approximately 1.0 at 40 mg./kg., 3.0 at 160 mg./kg. and 7.0 at 640 mg./kg. in this test. Drug toxicity is assumed to be the cause of death when treated mice die before untreated controls. Five mice were used in each test run at a specific dosage level.

[2] Dosage in milligrams of drug per kilogram of mouse body weight.

DISCUSSION OF TEST RESULTS

The evaluation results reported in the above table show antimalarial activity in 2-phenyl-4-(1-adamantyl)-6-dimethylaminomethylphenol, 2 - phenyl - 4 - t - butyl - 6- [N -methyl - N - (2 - cyanomethyl)]aminomethylphenol, and 2 - phenyl - 4 - t - butyl - 6 - [N -methyl - N-(n-octyl) aminomethyl]phenol hydrochloride.

Testing antimalarial compounds in humans is obviously too dangerous for the first step in the development of antimalarials. Thus, animal tests have conventionally been used to test antimalarial compounds and animal tests have led to the development of many of the antimalarial compounds now available such as quinacrine, chloroquine, pamaquine, and proguanil.

The Walter Reed Army Institute of Research uses the primary mouse screen with *Plasmodium berghei* for several reasons. One reason is that the Plasmodium species which cause malaria in humans (i.e., *Plasmodium falciparum* and *Plasmodium vivax*) cannot live in animals. Another reason is that *Plasmodium berghei* is regarded as a good model for human malaria. Finally, mice are easy to work with and the *Plasmodium berghei* infections show the same range of susceptibility to a variety of known antimalarial drugs as other malaria parasites used for evaluating antimalarial compounds. See for example Bull. Soc. Pathol. Exotique 42, 449 (1949); Ann. Trop. Med. Parasitol. 44, 291 (1950); Brit. J. Pharmacol. 8, 162 (1953); Z. Tropened. U. Parasitol. 2, 471 (1951).

I claim:
1. 2 - phenyl - 4 - (1 - adamantyl) - 6 - dimethylaminomethylphenol.

References Cited
UNITED STATES PATENTS 2,459,338  1/1949  Rawlins et al. _____ 260—570.9

ROBERT V. HINES, Primary Examiner

U.S. Cl. X.R.

260—465 E; 424—304, 330